E. L. TEICH.
ADJUSTING MECHANISM FOR DOOR BOLTS.
APPLICATION FILED FEB. 8, 1912.
1,033,057.
Patented July 16, 1912.
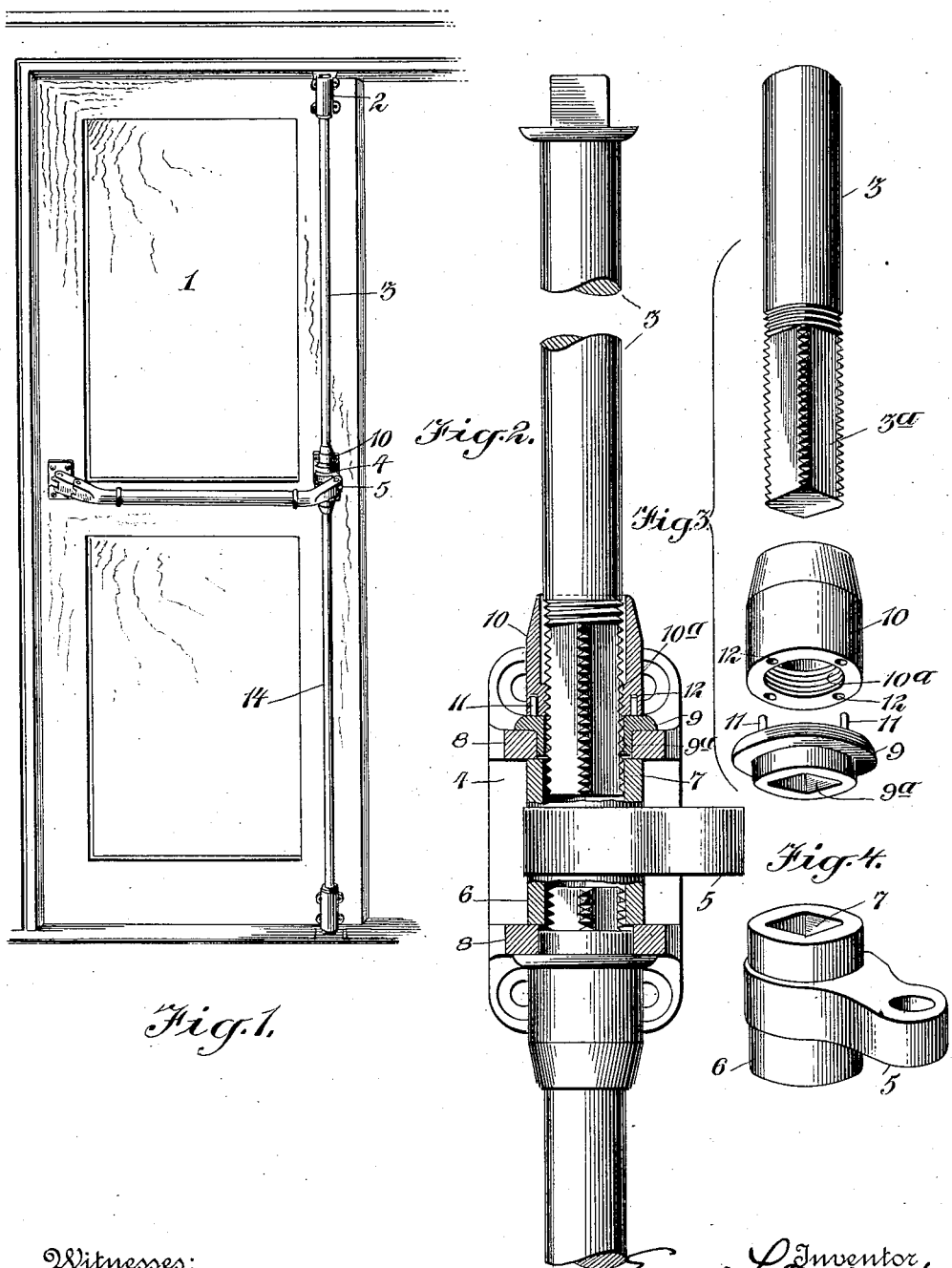

UNITED STATES PATENT OFFICE.

ERNEST L. TEICH, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

ADJUSTING MECHANISM FOR DOOR-BOLTS.

1,033,057.  Specification of Letters Patent.  Patented July 16, 1912.

Application filed February 8, 1912. Serial No. 676,291.

*To all whom it may concern:*

Be it known that I, ERNEST L. TEICH, a citizen of the United States, residing at New Britain, Hartford county, State of Connecticut, have invented certain new and useful Improvements in Adjusting Mechanism for Door-Bolts, of which the following is a full, clear, and exact description.

My invention relates to an improved adjusting mechanism for door bolts and the like.

The object of the present invention is to provide an effective adjusting means whereby the length of the bolt element may be changed.

The invention will be found to be of particular utility when employed in connection with so-called "panic door" bolts wherein long bolt rods extend upwardly and downwardly from the operating point to the bolt heads located ordinarily at the top and bottom of the door. It is in connection with such a device that I have elected to show my invention, although in a particular sense the invention is not limited thereto.

In the drawings, Figure 1 is a front elevation of a door equipped with my improvement. Fig. 2 is a relatively enlarged view, partly in section, of details of construction. Fig. 3 is a perspective view of three companion elements. Fig. 4 is a perspective view of another element.

1 represents a door.

2 represents the case or cover of the bolt proper. Since the particular form of the bolt proper is immaterial, the same is not shown.

3 is a shaft constituting the tail of the bolt, the same being connected thereto in any suitable way. In this particular instance the operation of the bolt is effected by rotating the shaft 3.

4 represents a bracket which is located about midway on the door to support the operating member.

5 represents the operating member, the same being in the form of a lever projecting laterally from a hub 6. The hub 6 has a squared open end 7 designed to receive the squared lower end $3^x$ of the shaft 3 so that when the hub is turned, the shaft 3 will be turned. The important thing to provide is a simple and effective means of ready adjustment whereby the rod 3 may be adjusted as to its end connections to allow for differences in distance from the bracket 4 or hub 6 to the bolt or bolt case 2. In many instances this distance, though originally designed to be a certain definite distance, may vary. This variation seldom exceeds a substantial fraction of an inch, and in the present construction I have provided adjusting means which enables this variation to be easily taken care of. The hub 6, carried by the bracket 4, ordinarily will stand between two shoulders 8—8, which shoulders are provided with a passage in line with the opening of the hub and sufficient to permit the squared end $3^a$ of the rod to pass freely therethrough to enter the hub. Indeed, this opening should be made sufficiently large to permit of the introduction of a bearing bushing 9, which likewise has a squared passage $9^a$ for the squared end $3^a$ of the rod. Standing above the bushing is an adjusting sleeve 10 which is provided with an internal thread $10^a$ at its lower end which makes a threaded engagement with the lower end of the shaft 3, a portion of said shaft and the corners thereof being properly threaded to coact with the threaded part of the sleeve 10. The unthreaded part of the sleeve 10 projects upwardly and covers at all times the threaded part of the shaft 3. Suitable coupling devices are arranged between the bushing 9 and the sleeve 10 whereby, when the parts are in their assembled position, said sleeve 10 and bushing 9 cannot turn independently, the function of this coupling being mainly to prevent the rotary displacement of the sleeve 10 upon the rod 3 after proper adjustment has been effected. In this particular instance, the clutch may comprise one or two pins 11—11 carried, for example, by the bushing 9 and arranged to enter perforations 12—12 in the lower end of the sleeve 10.

In operation, the distance between the bracket 4 or the hub 6 and the bolt head 2 is accurately determined. The sleeve 10 is then adjusted properly upon the rod 3 so that when all the parts are assembled, the upper end of the rod 3 will properly coact with the bolt 2, and likewise with the hub 6. The parts are then put together or assembled, which assembling involves the passing of the squared end of the rod 3 down through the bushing 9 and into the squared opening in the end of the hub 6. The clutch parts are so positioned that during this act of assembling, the clutch members 11 will enter the receiving pockets 12 on the sleeve 10. When thus assembled, it will be seen that the rocking of the hub 6 will impart a rocking movement to the shaft 3; and it will also be seen that the sleeve 10 cannot be turned to vary the adjustment since it is locked with the bushing 9 and since the bushing 9 in turn cannot be rotated on the shaft 3 by reason of the fact that said bushing is held against rotation on the squared part 3ª of said shaft. By this very simple means, quite a wide range of adjustment is possible. It is obvious that a corresponding adjustment may be provided for the bolt shaft or tail 14, but this need not be described since it would be merely a duplicate of the parts already fully pointed out.

While I have spoken of the lower end of the shaft 3 as being squared, obviously the particular cross sectional shape is immaterial so long as it is of a shape to prevent turning independently of the hub 6 and sleeve 10 when the parts are assembled. In the event of a modified shape, of course the passage through the bushing 9 and hub 7 would be correspondingly modified. So also, while I have shown the clutch as composed of simple pins 11 designed to enter receiving pockets 12 in the adjusting sleeve 10, the particular form of the clutch may be modified within a considerable range.

What I claim is:

1. In an adjusting mechanism of the character described, a rod, means for rocking said rod on its own axis and adjustable means between said rocking means and said rod comprising a bushing slidable on said rod, but not rotatable thereon, a sleeve threaded upon said rod and adjacent to said bushing and arranged to be adjusted longitudinally on said rod by rotation, and a clutch for detachably connecting said bushing and said sleeve to hold said parts against independent rotation.

2. In an adjusting mechanism of the character described, a rod, an operating device slidable but not rotatable upon said rod, a bushing also slidable but not rotatable upon said rod and a sleeve threaded upon said rod and adjustable longitudinally thereon by rotation, and a clutch between said sleeve and said bushing.

3. In an adjusting device of the character described, a rod, an operating device slidable but not rotatable thereon, a bracket for supporting said operating device, a bushing rotatably mounted in said bracket and slidably mounted upon said rod but not rotatable relatively thereto, a sleeve adjustable longitudinally on said rod and a screw thread connection between said sleeve and rod, and a clutch for detachably connecting said rotatable sleeve with said non-rotatable bushing when said parts are adjusted to the desired position.

ERNEST L. TEICH.

Witnesses:
C. A. PARKER,
PHILIP CORBIN.

Copies of this patent may be obtained for five cents each, by addressing the "Commissioner of Patents, Washington, D. C."